US007442322B2

(12) United States Patent
Sapienza et al.

(10) Patent No.: US 7,442,322 B2
(45) Date of Patent: Oct. 28, 2008

(54) ENVIRONMENTALLY BENIGN ANTI-ICING OR DEICING FLUIDS EMPLOYING INDUSTRIAL STREAMS COMPRISING HYDROXYCARBOXYLIC ACID SALTS AND/OR OTHER EFFECTIVE DEICING/ANTI-ICING AGENTS

(75) Inventors: Richard Sapienza, Shoreham, NY (US); Axel Johnson, Babylon, NY (US); William Ricks, Westerville, OH (US)

(73) Assignee: MLI Associates, L.L.C.

( * ) Notice: Subject to any disclaimer, the term of this patent is extended or adjusted under 35 U.S.C. 154(b) by 0 days.

(21) Appl. No.: 11/700,377

(22) Filed: Jan. 31, 2007

(65) Prior Publication Data

US 2007/0176139 A1 Aug. 2, 2007

Related U.S. Application Data

(62) Division of application No. 11/048,946, filed on Feb. 2, 2005, now abandoned.

(51) Int. Cl.
*C09K 3/18* (2006.01)
(52) U.S. Cl. .......................................... 252/70; 106/13
(58) Field of Classification Search ................... 252/70; 106/13
See application file for complete search history.

(56) References Cited

U.S. PATENT DOCUMENTS

| 1,776,181 | A |   | 9/1930 | Collins |
|---|---|---|---|---|
| 3,711,409 | A |   | 1/1973 | Ayres et al. |
| 4,329,449 | A |   | 5/1982 | Roth et al. |
| 4,448,702 | A |   | 5/1984 | Kaes |
| 4,501,775 | A |   | 2/1985 | Parks et al. |
| 4,676,918 | A |   | 6/1987 | Toth et al. |
| 4,746,449 | A | * | 5/1988 | Peel .............................. 252/70 |
| 4,960,531 | A |   | 10/1990 | Connor et al. |
| 5,324,442 | A |   | 6/1994 | Mathews |
| 5,531,931 | A |   | 7/1996 | Koefod |
| 5,635,101 | A |   | 6/1997 | Janke et al. |
| 5,709,812 | A |   | 1/1998 | Janke et al. |
| 5,709,813 | A |   | 1/1998 | Janke et al. |
| 5,876,621 | A |   | 3/1999 | Sapienza |
| 5,942,150 | A | * | 8/1999 | Heuer et al. ................... 252/70 |
| 5,980,774 | A |   | 11/1999 | Sapienza |
| 5,993,684 | A |   | 11/1999 | Back et al. |
| 6,080,330 | A |   | 6/2000 | Bloomer |
| 6,129,857 | A |   | 10/2000 | Sapienza |
| 6,156,226 | A |   | 12/2000 | Klyosov et al. |
| 6,229,046 | B1 |   | 5/2001 | Eyal et al. |
| 6,299,793 | B1 |   | 10/2001 | Hartley et al. |
| 6,315,919 | B1 |   | 11/2001 | Sapienza |
| 6,416,684 | B1 | * | 7/2002 | Bloomer ....................... 252/70 |
| 6,506,318 | B1 |   | 1/2003 | Sapienza et al. |
| 6,544,434 | B2 | * | 4/2003 | Sapienza ...................... 252/70 |
| 6,843,931 | B2 |   | 1/2005 | Sapienza |

FOREIGN PATENT DOCUMENTS

GB 796633 6/1958

* cited by examiner

*Primary Examiner*—Anthony J Green
(74) *Attorney, Agent, or Firm*—Locke Lord Bissell & Liddell; Alan B. Clement; Peter J. Fallon

(57) ABSTRACT

The present invention provides novel deicing and anti-icing compositions and methods based on by-produce of off-specification materials from biodegradable and renewable sources and which also can be used in a variety of other services.

1 Claim, No Drawings

ENVIRONMENTALLY BENIGN ANTI-ICING OR DEICING FLUIDS EMPLOYING INDUSTRIAL STREAMS COMPRISING HYDROXYCARBOXYLIC ACID SALTS AND/OR OTHER EFFECTIVE DEICING/ANTI-ICING AGENTS

CROSS REFERENCES TO RELATED APPLICATIONS

This application is a divisional application of application Ser. No. 11/048,946, filed Feb. 2, 2005 now abandoned.

FIELD OF THE INVENTION

The present invention relates to deicing fluid compositions and methods for deicing surfaces and for preventing ice formation (anti-icing) on surfaces or within aqueous fluids and preventing crystal formation within non-aqueous fluids. More particularly the present invention relates to deicing/anti-icing fluid compositions comprising hydroxycarboxylic acid salts and/or other effective deicing and/or anti-icing agents obtained as products or by-products of industrial and/or fermentation processes.

BACKGROUND OF THE INVENTION

Freezing point lowering compositions are in widespread use for a variety of purposes, especially to reduce the freezing point of an aqueous system so that ice cannot be formed or to melt formed ice. Generally, freezing point lowering compositions depend for their effectiveness upon the molar freezing point lowering effect, the number of ionic species that are made available and the degree to which the compositions can be dispersed in the liquid phase in which the formation of ice is to be precluded and/or ice is to be melted.

The most pervasive of the commonly used products for deicing are common salt, calcium chloride, magnesium chloride and urea, with common salt (sodium chloride) being the least expensive and most commonly used. Common salt widely is used to melt ice on road surfaces and the like. In this manner, the salt forms a solution with the available liquid in contact with the ice and thereby forms a solution with a lower freezing point than the ice itself so that the ice is melted. Chloride salts, however, suffer from relatively severe drawbacks, such as the harmful effects on surrounding vegetation by preventing water absorption in the root systems, the corrosive effects on animal skin, such as the feet of animals, clothing, roadways and motor vehicles, and the deleterious effects on surface and ground water. Thus, any new method of deicing or new deicing composition that can reduce the amount of chloride salts, or eliminate chloride salts entirely, would solve a long felt need in the art.

Other inorganic salts also are known to be useful as freezing point lowering agents such as, potassium phosphates, sodium phosphates, ammonium phosphates, ammonium nitrates, alkaline earth nitrates, magnesium nitrate, ammonium sulfate and alkali sulfates.

Another drawback of certain prior art deicing fluids is their high chemical and biological oxygen demands, which make them environmentally unfavorable. The glycols are exemplary of deicing fluids that particularly suffer from this type of environmental drawback. Thus, any new method of deicing or new deicing composition that can reduce the chemical or short term biological oxygen demands also would solve a long felt need in the art.

Typical aqueous solutions of low freezing point deicing and anti-icing agents include chloride salt brines, ethylene glycol and propylene glycol solutions. The use of chloride brines in anti-icing compounds can reduce, although not eliminate, the impacts of chlorides when applied as solids for deicing. Brines and glycol solutions also are employed as components of fluids used to transfer heat in applications where the fluid may be exposed to temperatures below the normal freezing point of water as well as components of drilling fluids employed in oil and gas operations. Ethylene glycol solutions are well known for use as coolants for automobiles and the like in regions where the temperature may fall below the normal freezing point of water. Ethylene and propylene glycols are used in relatively large quantities at major airports in northern climates in order to keep air traffic flowing during inclement weather. The fluids generally are applied to the wings, fuselage and tail of aircraft and in some instances to the runways to remove ice. Glycols also are employed as hydraulic fluids. However, as mentioned above, these glycol compounds likewise have environmental drawbacks and can be detrimental to aquatic life and to sewage treatment processes.

Other prior art deicing fluids, such as mono and polyhydric alcohols, have toxic effects and high volatility particularly in the low molecular weight range. Further, some of these may be the cause of offensive smells and fire danger. Furthermore, mono- and polyhydric alcohols oxidize in the presence of atmospheric oxygen to form acids, which can increase corrosion of materials.

Due to the problems associated with deicing agents as described above there have been attempts to discover even more deicing agents. For, example, Kaes, U.S. Pat. No. 4,448,702 discloses the use of a freezing-point lowering composition and method that calls for the addition of a water soluble salt of at least one dicarboxylic acid having at least three carbon atoms, such as a sodium, potassium, ammonium or organoamine salt of adipic, glutaric, succinic or malonic acid.

Peel, U.S. Pat. No. 4,746,449, teaches the preparation of a deicing agent comprising 12-75% acetate salts, trace-36% carbonate salts, 1-24% formate salts and 1-32% pseudolactate salts that is prepared from a pulp mill black liquor by fractionating the black liquor into a low molecular weight fraction and concentrating the collected low molecular weight fraction to produce the deicing agent.

U.S. Pat. No. 4,960,531 teaches that small amounts of methyl glucosides, i.e., less than 10%, can be employed as a trigger to conventional salt deicers.

Back et al., U.S. Pat. No. 5,993,684, teach the use of non potassium, non-nitrogen organic salts having a molecular weight less than 201 in anti-icing or deicing applications, but does not teach the use of by-product streams from industrial or fermentation processes. Further, Back teaches against the inclusion of potassium and halide salts or the use of glycol in formulations.

Parks et al., U.S. Pat. No. 4,501,775, teach the use of compositions comprising low concentrations of carboxylic acids, for the specific purpose of application to coal and mineral ores to insure that any ice formed thereon is physically weak and will not deter the unloading of the coal or mineral ores. Further, Parks et al. do not teach the use of by-product streams from industrial or fermentation processes.

Roe, U.S. Pat. No. 4,426,409, teaches the use of organic salts, in formulations for the purpose, as in Parks et al. above, of reducing the cohesive strength of particles when frozen. Further, Roe does not teach the use of by-product steams from industrial and fermentation processes.

Koefod, U.S. Pat. No. 5,531,931, teaches the use of low concentrations of water-soluble organic salts selected from the group consisting of gluconate salts, ascorbate salts, tartrate salts and saccharate salts in combination with water-soluble rare earth salts as agents to reduce the corrosive effects of chloride salts.

Special mention also is made of the Sapienza patents, U.S. Pat. Nos. 5,876,621, 5,980,774, 6,129,857, 6,315,919 and 6,506,318, which disclose especially useful deicing and anti-icing compositions (each of these references is incorporated herein by reference).

Mention also is made of a number of other patents that employ industrial process streams in preparing deicing and/or anti-icing compositions. Examples of such patents are Bloomer, U.S. Pat. No. 6,080,330 (desugared sugar beet molasses); Toth et al., U.S. Pat. No. 4,676,918 (alcohol distilling waste); Janke et al., U.S. Pat. No. 5,709,812 (whey); Janke et al., U.S. Pat. No. 5,709,813 (vintner's condensed solubles); Janke et al., U.S. Pat. No. 5,635,101 (corn wet milling process by-products); Bytnar, U.S. Pat. No. 6,468,442 (corn syrup); and Hartley et al., U.S. Pat. No. 6,299,793 (corn syrup).

However, there still exists in the art a need for further improved deicing and/or anti-icing compositions and methods, which are environmentally benign and/or reduce detrimental environmental effects and that are relatively inexpensive to obtain. Preferably, these new and improved compositions are free of or reduce the use of inorganic salts, are more environmentally benign and are prepared from relatively inexpensive raw materials while still possessing desirable freezing point depression properties. Likewise, there also exists a need in the art for new deicing and/or anti-icing agents that can be used in combination with prior art deicing agents such as inorganic salts or glycols, to substantially reduce the amount of inorganic salts or glycols needed to accomplish the deicing/anti-icing objectives, and thereby concomitantly reduce the detrimental environmental effects of the salts and/or glycols. Surprisingly, the present inventors have found that compositions disclosed herein meet these needs while facilitating by-product disposition from production of hydroxycarboxylic acids and of polymers based upon renewable resources. Production of biodegradable polymers from agriculturally derived sources such as lactic acid is an important strategy to reduce dependence on fossil hydrocarbons for petrochemical feedstocks, and providing a means for achieving economic value from by-product and off specification streams of these processes is an important element in achieving reasonable production economics.

SUMMARY OF THE INVENTION

The present inventors have found that excellent deicing compositions comprising hydroxycarboxylic acid salts and/or other effective deicing/anti-icing agents can be obtained utilizing streams produced from, or process streams within, industrial and agricultural processes and in waste streams from such processes. Hydroxycarboxylic acids, their salts, their esters and other agents may be contained in said streams, or may be produced by at least partially reacting hydroxycarboxylic acid(s) or other acids contained in said streams to produce the corresponding salts or esters.

It is therefore one preferred embodiment of the present invention to provide components of deicing and/or anti-icing formulations wherein the components comprise hydroxycarboxylic acid salts produced by reacting hydroxycarboxylic acids produced in fermenting sugar containing streams to form the salts. The hydroxycarboxylic acids lactic acid, citric acid, glycolic acid and gluconic acid often are produced sugar fermentation processes.

A further preferred embodiment of the present invention is to provide components of deicing and/or anti-icing formulations wherein the components comprise hydroxycarboxylic acid salts produced by reacting hydroxycarboxylic acid recovered from polymer production. Recovery of lactic acid or glycolic acid from waste streams or off specification material from the production of polyglycolate or polylactate polymers with subsequent conversion of the rejected polymer, lactide dimer or recovered lactic or glycolic acid to a lactic or glycolic acid salt or ester from the latter is an example of such an embodiment.

In yet another embodiment of this invention, off specification monomers, intermediate streams and product streams from renewable resource based monomer and polymer production processes are recovered and modified, if necessary, to provide effective components of deicing/anti-icing formulations. In addition to lactic acid based polymers, this field includes other approaches such as succinate biodegradable polymers and biodegradable polytrimethylene terephthalate (PTT) based upon 1,3-propanediol produced by fermentation. Recovered off-specification intermediates or monomers in many cases can be used as components of deicing and/or anti-icing agents in accordance with the present invention.

In certain cases, streams from petrochemical monomer production are recovered and used in deicing/anti-icing service. For example, in production of 1,3-propanediol from butane via maleic anhydride, the bottoms from 1,3-propanediol fractionation are used for anti-icing of coal for shipment. Other fossil hydrocarbon based processes also yield off specification residues that can be used in this and similar services. The present invention, however, focuses on the novel and unobvious utilization of off-specification or by-product streams from biomass processing used to produce intermediates and monomers for polymer production and/or processes to produce biodegradable polymers.

The present invention still further provides a method for reducing the amount of inorganic salt necessary to achieve effective deicing and/or anti-icing, comprising adding to the inorganic salt, an effective freezing point reducing amount of the hydroxycarboxylic acid salt and/or other agent containing deicing and/or anti-icing composition alone, or in combination with an effective freezing point lowering amount of (a) a hydroxyl-containing organic compound selected from the group consisting of hydrocarbyl aldosides; sorbitol and other hydrogenation products of sugars, monosaccharides, maltodextrins and sucrose; maltitol; glycerol; glycols; monosaccharides and mixtures thereof, and/or (b) an organic acid salt selected from the group consisting of a carbonic acid salt, a carboxylic acid salt, a hydroxycarboxylic acid salt, a dicarboxylic acid salt and mixtures thereof.

The compositions of the present invention further may comprise a variety of other materials to enhance the deicing and anti-icing performance, such as, but not limited to, coarse solids to improve vehicle traction, corrosion inhibitors to prevent or reduce vehicular and infrastructure corrosion and buffers to control the pH of the compositions.

The compositions and methods of the present invention can be applied to a wide variety of surfaces, including both metallic and non-metallic surfaces of aircraft, which prevents icing, removes frozen water from the surface and prevents its reformation. The invention provides for a deicing composition that can be used on airport runways, bridges, streets, other structures including power lines and industrial equipment such as the decks and exposed superstructure of ships, conveyor systems, storage facilities, support systems and the like. Further, the compositions can be used in heat transfer applications such as, but not limited to, automobile radiator coolants, air conditioner fluids and process heat transfer fluids, and in other applications in which it is vital or desired to maintain a liquid in the unfrozen or mobile state, e.g., as in a fire extinguisher, hydraulic fluids, pour point depressants or in well drilling work fluids, such as those used in drilling for oil and gas including completion fluids and workover fluids. This includes non-aqueous solutions, e.g., biodiesel or diesel fuel. Additionally, the present invention provides for an anti-icing composition that can be applied to a surface, such as bridges, prior to the onset of icing conditions in order to prevent icing from occurring.

Still further, the compositions of the present invention can be used as a deicer and/or anti-icer for pre-harvest fruit and vegetable crops or other vegetation, such as, but not limited to, golf course greens.

DETAILED DESCRIPTION OF THE PREFERRED EMBODIMENTS

The present invention provides novel compositions useful as deicing agents and/or anti-icing agents and the corresponding novel methods. The novel compositions of the present invention comprise hydroxycarboxylic acid salt(s) contained in, or derived from hydroxycarboxylic acid(s) contained in (1) products or by-products from fermentation processes and/or (2) products and/or by products of industrial or agricultural processes. Specific examples are:

Fermentation

Several hydroxycarboxylic acids, including citric acid, lactic acid glycolic acid and gluconic acid, are produced by fermentation processes as are other acids such as succinic acid—a dicarboxylic acid. The following are examples of such processes:

Lactic Acid

Lactic acid commonly is produced by bacterially-conducted fermentation processes employing carbohydrates as the feedstock. Commonly, bacteria from the *Lactobacillus* genus are employed in these operations.

The *Lactobacillus* organisms produce lactic acid and without a neutralizing agent the pH drops rapidly to a level where the microorganisms die or cease useful activity. To counteract this effect, it is usual in these processes to add a neutralizing agent in order to achieve high overall productivity. The pH values for fermentation with good productivity typically range from about 5.0 to about 7.0. Good productivity being defined as a production rate >0.5 grams/liter/hr.

A common technique has been to add an alkali material during the fermentation process as a buffering salt to maintain the pH in the desired region. Frequently calcium hydroxide is added as the resulting calcium lactate salt has a low solubility and can be conveniently removed as a solid. This solid then is acidified with a strong acid, such as sulfuric acid, releasing lactic acid and a gypsum (calcium sulfate) by-product.

An alternative approach is to use a material such as potassium hydroxide as the alkali, which thereby yields a water-soluble lactate—potassium lactate. This approach is discussed in Eyal et al. (U.S. Pat. No. 6,229,046) as part of a strategy to provide a recycle of soluble lactate so as to achieve the desired lactic acid/lactate equilibrium with a minimum addition of potassium hydroxide. Eyal et al. combine this approach with selection of bacteria strains having good levels of productivity at lower pHs. This approach then requires a separation technique to separate the lactic acid from the lactate salt. Eyal et al. discuss several approaches either to remove lactic acid from a lactic acid/lactate mixture such as the fermentation broth or to remove the lactate salt.

Approaches discussed by Eyal et al. for removal of lactate salt from the fermentation broth include:
(1) Extraction, employing for example, a quaternary amine such as methyl trioctyl ammonium chloride.
(2) Solid absorbent, employing for example, a strong anion exchanger such as fixed quatenary ammonium compounds. Examples include Amberlite IRA-400 available from Rohm and Haas Co. of Philadelphia, Pa.
(3) Membrane separation employing electrodialysis.
(4) Crystallization.
(5) In addition, water can be removed by distillation or evaporation.

If it is desired to. produce a lactate salt for use in a deicing or anti-icing agent of the present invention, a likely choice would be either sodium or potassium lactate. These products could be produced employing the techniques described above in several ways.

One case is the instance where the desired product would be a soluble deicing salt such as sodium or potassium lactate. This could be a seasonal or intermittent use of a process facility designed for lactic acid production. In this case, where no production of lactic acid is desired, the simplest approach is to supply the *Lactobacillus* with the amount of nutrient carbohydrate needed to achieve the practical limit of lactic acid/lactate production, add a caustic such as potassium acetate to control pH, and when the bacteria has ceased to function, add sufficient caustic to neutralize some or all of the remaining lactic acid in order to bring the final pH to the desired level. Depending on the choice of operating parameters and feeds, the lactate level at the conclusion of such a process can be 100 g/l (ca 10%) or more. As sodium or potassium lactate, this could result in a concentration of 12-15% or more.

At a 15% concentration of sodium lactate in water, the freezing point will be about −7 C., a bit lower than the freezing point of propylene glycol at the same concentration. We have found however that even at such a low concentration of KLac, there is a synergistic effect resulting from addition of this material to deiciers such as magnesium chloride and sodium chloride brines.

A dilute stream in the range of 3-10% lactate salt also can be applied usefully to deicing/anti-icing applications by addition of other materials useful in preparation of deicing/anti-icing agents. Examples of such materials include, but are not limited to sugars, hydrocarbyl aldosides, glycols, glycerol, amino acids amino acid salts, other hydroxycarboxylic acid salts and mixtures thereof. Such formulations may be used in a concentrated form as a non-chloride deicer. Alternatively, such agents may be used to enhance the properties of other deicing agents such as solid chlorides or chloride brines.

If desired, the dilute lactate salt produced in the above manner may be concentrated further. Any of the number of techniques discussed by Eyal et al. could be used. A preferable approach could employ a combination of ultra-filtration and reverse osmosis. A first stage of ultra-filtration would remove entrained materials and particulates down to approximately 0.05 microns. This would be followed by one or more stages of reverse osmosis depending on the concentration level required or desired. Alternatively, the lactate salt could be concentrated by evaporation of a portion of the contained water. The product from such an operation could be used in applications requiring a concentrated non-chloride deicing/anti-icing material, such as, but not limited to, airport runway applications.

Fermentation Involving Industrial and Agricultural Process Streams.

Useful materials for deicing/anti-icing use as-is, or for blending with other components to produce further improved deicing/anti-icing agents, may be produced from many industrial and agricultural process streams. Often these streams are of low value, but contain useful materials that cannot be recovered economically in their pure form.

An example is steepwater produced in wet milling of corn. This process involves a countercurrent flow of water, initially containing some SO2, and dried corn in a series of tanks at temperature of 50-55 C. Steeping results in the extraction of water-soluble components, and microorganisms are present, especially lactobacilli. The result is a progressive fermentation of some of the extracted carbohydrates yielding lactic acid. Normally the steeping process culminates in a concentration step to yield corn steep liquor known as condensed fermented corn extractives.

A study has been made of the progress of steep analyses as the process proceeds. (Hull, S. R. et al J. Agric. Food Chem. 1996, 44, 1857-1863) Analyses were taken at three stages in the steep process designated as "early" (1-3 hrs), "middle" (14-17 hrs), and "late" (27-30 hrs). Data for one of the cases studied are presented below:

| stage | pH | Dry solids g/L | Total carbohydrate g/L | Amino acid g/L | Lactic acid g/L |
| --- | --- | --- | --- | --- | --- |
| Early | 3.5 | 27.5 | 5.6 | 8.0 | 4.0 |
| Middle | 4.5 | 68.9 | 10.8 | 21.6 | 18.4 |
| Late | 4.1 | 112.2 | 17.2 | 33.1 | 28.2 |

At any of the stages of production, a useful agent or component of an agent for deicing/anti-icing can be prepared from any of these streams by reacting some or all of the acids present to form the salts—such as sodium or potassium lactate by methods such as those taught by Sapienza, U.S. Pat. No. 5,876,621. The carbohydrates and the amino acid salts formed also are useful components of a deicing agent as also taught in the Sapienza patents.

Beyond direct use of the reacted corn steep as a deicing/anti-icing component or agent, these materials further can be modified to enhance their value as components of deicing/anti-icing agents:

(1) Steepwater removed from the process at any point can be concentrated by evaporation, either prior to, or after being reacted to produce the lactates.

(2) Following removal from the process, the steepwater can be allowed to continue its fermentation until either the supply of carbohydrates is exhausted, or the bacilli cease to be viable. This step can be undertaken after the initial lactic acid is converted to lactate, thereby insuring an environment suitable for fermentation to continue.

(3) Additional carbohydrate can be added to the steepwater while undergoing processing per (2).

(4) In any of the above cases, a purer, cleaner product can be produced by ultra-filtration to remove solids.

(5) Following (4), the products further can be concentrated using reverse osmosis to remove water.

(6) To enhance further the deicing/anti-icing characteristics, other components taught in the Sapienza patents can be added to the products of any of the above alternative approaches. Without limitation these could include, sugars, hydrocarbyl aldosides, glycerol, a variety of inorganic and organic soluble salts.

The above approaches can be applied to a large number of industrial and agricultural waste or low value streams. In many cases it will be necessary to introduce appropriate bacilli should they not occur naturally in the process stream. Examples of such streams include stillages, such as thin stillage from ethanol production, agricultural fermentation products such as cheese whey, sugar containing waste streams from food processing, and molasses from beet or cane sugar processing.

Recovery of Hydroxycarboxylic Acid Salts and Other Deicing/Anti-Icing Agents from Industrial Processes.

An example of this approach involves processes under development and commercialization that employ lactic acid to produce lactic acid polymers (polylactates polylactic acidpla) for use in a variety of industrial and consumer applications. Production of these polymers typically involves condensation of the lactic acid monomer to lactide (a dimer/ester), which then is catalytically converted to the polymer. In this process, waste and off-specification streams are likely to occur. In the case of the lactides and pla these materials can be partially or fully converted to lactate salts or esters, by methods such as those taught in the Sapienza '621 patent.

Other synthetic and naturally-derived biodegradable polymers currently being commercialized include polyglycolide (PGA), closely related to the lactic acid polymer; the polyhydroxyalkanoates (PHA), linear polyesters produced in nature by bacterial fermentation of sugar or lipids, the majority of PHAs are composed of R(−)-3-hydroxyalkanoic acid monomers ranging from C3 to C14 carbon atoms with variety of saturated or unsaturated and straight- or branched chain containing aliphatic or aromatic side groups, the most common type of PHAs is PHB (poly-beta-hydroxybutyrate); succinate biodegradable polymers employing succinic acid produced by fermentation. Also DuPont and Tate & Lyle have reported a fermentation and separation technology that will produce 1,3-propanediol for PTT production. In cases such as these, waste or off-spec materials from the fermentation or polymerization steps may be recovered and employed as deicing/anti-icing agents in accordance with the present invention. Also included within the scope of the present invention is polycaprolactone (PCL), a biodegradable thermoplastic polymer derived from the chemical synthesis of crude oil. Although not produced from renewable raw materials, it is fully biodegradable.

The above approaches can be applied to a large number of biodegradable polymers that include a wide variety of materials derived from renewable resources, such as starch, cellulose and polyhydroxy alkanoates and from synthetic means such as polylactic acid and polycaprolactone. Also, contemplated for use within the scope of the present invention are lignin-based biodegradable polymers, soy and other protein-based plastics; polymers based on synthetic genes and biodegradable polymers from soybeans.

Production of Lactic Acid Salts for Deicing/Anti-Icing Agents as By-Products of Lactic Acid Production.

A typical process for lactic acid production has been described above. This process can be operated to produce lactate salt as a by-product. As is pointed out in that discussion, the Eyal et al. patent describes an approach in which the buffering agent is selected to yield a soluble salt—rather than a precipitate such as calcium lactate. Examples of such buffering agents include sodium or potassium hydroxide. In the case described by Eyal et al., the soluble salt is returned to the fermentation process after separation from the lactic acid.

If it is desired to produce the lactate salt, one of the separation techniques described in Eyal et al. could be employed.

Production of a net yield of lactate salt need not preclude recycle of lactate to the fermentation process together with the microorganisms. Following separation of product lactic acid, the lactate rich stream could be all, or partially sent to an ultra-filtration stage operated at less than complete recovery of the lactate salt. The unfiltered portion can then be recycled to the fermenter thereby avoiding loss of the bacilli.

Production of Lactic Acid Esters for Deicing/Anti-Icing Agents as By-Products of Lactic Acid Production.

A commercial process for chemical synthesis of lactic acid is based on lactonitrile. Hydrogen cyanide is added to acetaldehyde in the presence of a base to produce crude lactonitrile, which then is purified and hydrolyzed to lactic acid, either by concentrated HCl or by $H_2SO_4$ to produce the corresponding ammonium salt and lactic acid. Lactic acid then is esterified with methanol to produce methyl lactate, which is removed and purified by distillation and hydrolyzed by water under acid catalyst to produce lactic acid and the methanol.

Lactic acid has a boiling point of 100° C. which makes it very difficult to separate from crude lactic acid aqueous solutions e.g. from fermentation solutions. Crude lactic acid mixture can be reacted with alcohols like methanol and the like in a batch reactive distillation apparatus with simultaneous distillation of the volatile methyl lactate as a distillate. If it is desired, this process can be operated to produce the methyl lactate ester as a by-product. To produce other lactate esters other alcohols can be utilized as would be understood by those of ordinary skill in the art in light of this detailed disclosure.

Production of Citric Acid Salts or Esters for Deicing/Anti-Icing Agents as By-Products of Acid Production.

Another hydroxycarboxylic acid, citric acid or 2-hydroxy-1,2,3-propanetricarboxylic acid, can be isolated from the juice of citrus fruits by adding calcium oxide (lime) to form calcium citrate, an insoluble precipitate that can be collected by filtration; the citric acid can be recovered from its calcium salt by adding sulfuric acid. Though it does occur naturally in fruits, most citric acid is produced in refineries all over the world by fermenting cane sugar, molasses, and dextrose by use of the fungus *Aspergillus niger* and can be obtained synthetically from acetone or glycerol.

Similar to lactic acid processing, an approach in which the buffering agent is selected to yield a soluble salt or ester— rather than a precipitate ester can be employed. Selection of such buffering agents is well within the skill of one of ordinary skill in the art.

Gluconic Acid/Gluconate Production.

Gluconic acid generally is produced by direct dehydrogenation of d-glucose employing a microorganism—generally *Aspergillus niger*—in an aerobic fermentation. The medium typically consists of d-glucose (lactose), several inorganic salts and corn steep liquor. The equilibrium between the lactose and gluconic acid is controlled by the pH and the temperature of the medium. Generally calcium or sodium gluconate is formed depending on the alkali used for pH control.

Following fermentation the broth is filtered and the microorganisms and other suspended solids are recycled to the fermenter. The gluconate solution then is evaporated to crystallize the gluconate and the product is separated by filtation. Sodium gluconate is considerably more soluble in water than calcium gluconate, and in that case the residual mother liquor, after crystal removal, has a significant concentration of sodium gluconate as well as unconverted sugar. In an operation using a commercial high glucose corn syrup as the raw material, the remaining mother liquor has a sodium gluconate concentration of 27-33 weight percent and 12-17 weight percent of residual sugars.

In the production of sodium gluconate, caustic addition usually is conducted to maintain a pH of about 4-5. This prevents free caustic in the product, but as a result there is a residual amount of gluconic acid mother liquor product. This product can be used as is, but normally would be adjusted to a more neutral or slightly alkaline pH for deicing use by addition by adding additional caustic after the crystalline product is removed.

The corrosion resistance capabilities of sodium gluconate are well known—including the effects of inclusion of sodium gluconate in chloride deicing/anti-icing formulations. Surprisingly we have found that in addition to the corrosion inhibition effects, this mother liquor is very effective in improving the freezing point characteristics of chloride formulations. For example, a solution of magnesium chloride in water has a eutectic temperature of −34 C. When a mother liquor of the type described above is added to a magnesium chloride solution in the amount of about 1 part mother liquor to 3 parts of magnesium chloride, the resulting mixture has a eutectic temperature of −52 C.

It is envisioned that any of the compositions of the present invention can be prepared for use in either a liquid or a solid format. For instance, the compositions can be prepared as a liquid by mixing with water and sprayed or spread on surfaces. Alternatively it can be prepared in a solid form. Optionally, the solid further may be processed using methods well known in the art such as, for example, pelletizing, prilling, flaking, or macerating to provide the formulation in a final useable solid form. Any of the binders known to those skilled in the art optionally may be present and either may be inert or may be comprised of components that actively help lower the freezing point and/or provide improved traction, for example, cinders, sawdust, sand, gravel, sugars, maltodextrins, naturally occurring minerals such as magnesium chloride, trona and mixtures thereof can be used.

It further is envisioned that the compositions of the present invention also may comprise corrosion inhibitors. Such corrosion inhibitors may include, but are not limited to, inhibitors comprising salts of gluconic acid or inhibitors comprising salts of monocarboxylic acids.

The amount of hydroxycarboxylic acid salt(s) ester(s), or other freezing point lowering consituents required to be effective in deicing or anti-icing compositions of the present invention that is required to be can vary over a considerable range.

It further is contemplated within the scope of the present invention, that in addition to the process-derived streams discussed above, the deicing or anti-icing composition can be combined with an effective freezing point lowering amount of an additive comprising (a) a hydroxyl-containing organic compound selected from the group consisting of hydrocarbyl aldosides; sorbitol and other hydrogenation products of sugars, monosaccharides, maltodextrins and sucrose; maltitol; glycols; glycerol; monosaccharides and mixtures thereof, and/or (b) an organic acid salt selected from the group consisting of a carbonic acid salt, a carboxylic acid salt, a hydroxycarboxylic acid salt, a dicarboxylic acid salt and mixtures thereof. The amount of additive generally ranges from about 0.5 to about 95 weight percent based on the weight of the additive and by-product.

Certain of the hydrocarbyl aldosides useful in the practice of the present invention are non-alkyl aldosides some of which are known to those of ordinary skill in the art, such as the di- and polysaccharides. Examples of non-alkyl hydrocarbyl aldosides useful in the practice of the present invention are the glucofuranoside sucrose (table sugar), and maltose and higher polyglucosides.

The hydrocarbyl aldosides also comprise alkyl aldosides. Alkyl aldosides can be prepared, for example, as described in U.S. Pat. Nos. 4,223,129 and 4,329,449, which are incorporated herein by reference. Typical of the alkyl aldosides useful in the practice of the present invention are alkyl glucosides, alkyl furanosides, alkyl maltosides, alkyl maltotriosides, alkylglucopyranosides, mixtures thereof and the like.

Other hydroxyl-containing compounds useful in the practice of the present invention are sorbitol and other hydrogenation products of sugars, monosaccharides, maltodextrins and sucrose such as maltitol, xylitol and mannitol; glycols such as ethylene glycol and propylene glycol; glycerols; and monosaccharides. These materials are available commercially and are well known to those of ordinary skill in the art.

The organic salt components useful in the practice of the present invention include the carboxylic acid salts, the hydroxycarboxylic acid salts, dicarboxylic acid salts.

The carboxylic acid salts that are useful in the practice of the present invention are likewise available commercially and are known to those skilled in the art. Carboxylic acid salts preferred for use in the practice of the present invention comprise the sodium or potassium salts of formates, acetates, propionates, butyrates and mixtures thereof. Also preferred are potassium acetate and/or potassium formate.

The dicarboxylic acid salts that are useful in accordance with the present invention are available commercially and are known to those skilled in the art. Preferred dicarboxylic acid salts comprise sodium and potassium salts of oxalates, malonates, succinates, glutarates, adipates, maleates, fumarates and mixtures of any of the foregoing.

Also useful as a deicing component in certain of the compositions of the present invention are the high solubility carbonic acid salts. Preferred carbonate salts for use in the practice of the present invention are potassium carbonate, potassium bicarbonate, sodium carbonate and cesium carbonate. Potassium carbonate especially is preferred.

Also useful as deicing components in certain compositions of the present invention are the highly soluble salt forms of sodium formate, potassium acetate and sodium lactate. In many applications, the addition of these salts has been found to provide synergistically unexpected reductions in freezing points.

The present invention still further contemplates combining the hydroxycarboxylic acid salt(s) and other effective freezing point lowering constituents of this invention with other industrial process streams useful in deicing and/or anti-icing products. For example, the other industrial process streams may be selected from any such streams containing the hydroxyl or organic acid compounds enumerated above including, but not limited to, those selected from the group consisting of a grain stillage, grain steepwaters, wood stillage, corn syrups, products of agricultural or milk fermentation processes, products of sugar extraction processes such a desugared sugar beet molasses and/or desugared sugar cane molasses, hydrogenation products of sugars, monosaccharides, maltodextrins and sucrose and mixtures of any of the foregoing. These industrial streams may be employed directly, or may be treated, such as by alcoholysis to convert the hydroxyl containing compounds to esters, or by reacting convert the organic acids to anionic organic acid salts, such as with a caustic.

Generally, the deicing and/or anti-icing agents useful in the practice of the present invention may be used in solid form, liquid form or liquid form mixed with water or other carrier liquids.

In addition to (a) the certain hydroxyl-containing organic compounds and (b) the certain organic acid salts, it is contemplated by the present invention that other organic components may be included in the deicing and/or anti-icing compositions of the present invention. Exemplary of such materials are citrate salts such as sodium citrate; amino acids and their salts such as lysine glutamate, sodium pyrrolidone carboxylate and sodium glucoheptonate; lignin components such as lignin sulfonate; boric acid and its salts; and mixtures of any of the foregoing.

In the methods of the present invention, the deicing and/or anti-icing compositions of the present invention are applied, such as by spraying for liquid forms, or spreading for solid forms, onto the surface desired to be treated. In the case of deicing, the surface already has ice formed thereon, and the deicing compositions of the present invention melt the ice already formed and further are effective in preventing additional ice formation. In the case of anti-icing, upon learning of a weather forecast that predicts possible dangerous icing conditions, the roads, bridges, airplanes, runways, growing produce or other surfaces can be pretreated with the anti-icing compositions of the present invention in similar manner in order to prevent ice formation on the treated surfaces.

In the methods of the present invention, the deicing and/or anti-icing compositions of the present invention also are useful in reducing the pour point and cold filter plugging point of oils, particularly environmentally capable oils, such as vegetable oils and the methyl esters of vegetable oils (such as rapeseed and soybean oils) that commonly are used as alternative environmentally compatible diesel fuels (biodiesel). As an ester with or without an esterified polymer or unconverted biodegradable polymer; product solubility with diesel, crude oil and common aromatic and agricultural solvents such as turpentine, limonene, or pinene interferes with wax crystal growth patterns, thereby these products prevent interlocking of wax crystals and can be applied as or with an anti-gel treatment/flow improver/pour point depressant additive that lowers the temperature at which oil will pour or flow. Furthermore, this can be used as a method for preventing crystals of water and/or wax in jet and diesel fuel that can clog the fuel filters.

In situations where some inorganic salts, such as, but not limited to, sodium chloride, magnesium chloride and calcium chloride, can be tolerated, the present invention provides an improved method for reducing the amount of salt to be added to achieve an equivalent or better deicing and/or anti-icing effect, and thereby reduce the detriment to the environment. Further, as cited earlier, we have found that addition of the hydroxycarboxylic acid salt containing streams is effective in achieving the effective use of these chlorides in temperature regions substantially below the eutectic points of the simple chloride solutions.

The methods of this invention also apply to inhibiting crystallization in non-aqueous systems. For example we have found that addition of esters of hydrocarboxylic acid with or without an esterified hydrocarboxylic acid polymer or unconverted biodegradable polymer to a biodiesel act to inhibit crystallization of residual fatty acids and salts of fatty acids (soaps), thereby reducing the pour point of the biodiesel. For example, a 10% solution of ethyl lactate or tributyl citrate in a turpentine carrier along with 1-2% polylactic acid polymer will reduce the pour point of a soy biodiesel (methyl soyate) by 10 F. Other vegetable esters such as those used as solvents, lubricants or additives also can be treated. Successful formulations for the reduction in pour point for biodiesel and methylsoyate also have been prepared when combined with petroleum based diesel, methylmethacrylates and copolymers of ethylene and propylene.

Many variations of the present invention will suggest themselves to those skilled in the art in light of the above-detailed description. For example, the hydroxycarboxylic acid salt containing streams can be combined with any industrial process stream that contains carboxylic acid salts, hydroxycarboxylic acid salts and/or dicarboxylic acid salts in preparing compositions of the present invention. Additionally, a wide variety of glucosides, carbonates, hydrocarbyl aldosides, and a variety of combinations of the components of the present invention may be employed as additives to the compositions of the present invention. All such obvious modifications are within the full-intended scope of the appended claims.

The above-referenced patents, test methods, and publications are hereby incorporated by reference.

The invention claimed is:

1. A process for producing a deicing and/or anti-icing agent comprising an effective freezing point lowering amount of an organic compound, said process comprising a process selected from the group consisting of:
   a. fermenting a carbohydrate employing a suitable bacillus selected from the *Lactobacillus genus*, adding a caustic agent to produce a soluble hydroxycarboxylic acid salt, and/or an alcohol to produce a hydroxycarboxylic acid ester, during the fermentation process or later, and
   b. recovering monomers, polymers, esters and/or salts from off-spec and/or waste streams from production of synthetic and/or naturally derived biodegradable polymers selected from the group consisting of polylactate, polyglycolide, polyhydroxyalkonates, linear polyesters, polycaprolactone and mixtures thereof, and optionally, reacting said monomers and/or polymers with caustic or alcohols to produce salts or esters;

said deicing and/or anti-icing agent optionally further comprising a component selected from the group consisting of:
   (i) a hydroxyl containing organic compound selected from the group consisting of hydrocarbyl aldosides; glycols; glycerol; monosaccharides; hydrogenation products of sugars and/or maltodextrins, and mixtures thereof,
   (ii) soluble salts selected from the group consisting of inorganic salts, carbonic acid salts, carboxylic acid salts, hydroxycarboxylic acid salts, dicarboxylic acid salts and mixtures thereof,
   (iii) an effective freezing point lowering amount of an industrial or agricultural stream,
   (iv) an effective freezing point lowering amount of an organic compound selected from the group consisting of ethyl lactate, glycerol lactate, glycerin carbonate, pipecolic acid and its esters, amino acids and/or their salts; lignin compounds, boric acid, boric acid salts, lysine glutamate, sodium pyrrolidone carboxylate, sodium glucoheptonate, lignin sulfonate and mixtures thereof, and
   (v) mixtures of two or more of (i), (ii), (iii) and (iv).

* * * * *